United States Patent [19]

Maemoto et al.

[11] 4,098,979

[45] Jul. 4, 1978

[54] METHOD FOR PREPARING EASILY PROCESSABLE POLYOLEFIN GRANULE

[75] Inventors: Kenichi Maemoto, Takatsuki; Takezo Sano, Ibaragi; Akio Kobayashi, Toyonaka, all of Japan

[73] Assignee: Sumitomo Chemical Company, Limited, Osaka, Japan

[21] Appl. No.: 423,911

[22] Filed: Dec. 12, 1973

Related U.S. Application Data

[63] Continuation of Ser. No. 212,684, Dec. 27, 1971, abandoned.

[30] Foreign Application Priority Data

Dec. 29, 1970 [JP] Japan .................... 45-124406

[51] Int. Cl.$^2$ .................... C08F 4/02; C08F 10/00
[52] U.S. Cl. .................... 526/100; 252/429 B; 252/431 P; 526/105; 526/141; 526/142; 526/159; 526/161; 526/169.2; 526/348; 526/351; 526/352; 526/904
[58] Field of Search .................... 260/93.7, 94.9 DA; 526/100, 105, 141, 142, 159, 161

[56] References Cited

U.S. PATENT DOCUMENTS

| | | | |
|---|---|---|---|
| 3,300,457 | 1/1967 | Schmid et al. | 260/94.9 DA |
| 3,669,945 | 6/1972 | Nakaguchi et al. | 260/94.9 C |
| 3,701,766 | 10/1972 | Delbouille et al. | 260/94.9 DA |
| 3,772,261 | 11/1973 | Faltings et al. | 260/94.9 DA |

FOREIGN PATENT DOCUMENTS

| | | |
|---|---|---|
| 601,919 | 7/1960 | Canada. |

*Primary Examiner*—Edward J. Smith
*Attorney, Agent, or Firm*—Stevens, Davis, Miller & Mosher

[57] ABSTRACT

Easily pourable polyolefin granules are obtained by polymerizing an olefin in the presence of a polymerization catalyst system comprising a compound having a main catalyst component supported on a spheroidal particle, 1 to 1,000 $\mu$ in diameter, of a high molecular compound used as a carrier, and an organometallic compound under a pressure of 100 kg/cm$^2$ or less and at a temperature lower than both of the melting points of the resulting polymer and the said high molecular compound used as a carrier. The granule diameter of the said polyolefin can be controlled very easily by changing the particle size of the high molecular compound used as a carrier, the loading rate of the main catalyst component on the high molecular compound used as a carrier, or the catalyst efficiency. The granule size distrubution can be controlled by controlling the particle size distribution of the high molecular compound used as a carrier. The polyolefin granules obtained have a bulk density of 0.4 to 0.6 g/cc, containing little of fine powders of the polyolefin, and are uniform in size and shape, so that they are directly usable in the same way as in the case of ordinary pellets as a material for common molded articles such as, for example, injection-molded articles, blow-molded articles, or films. When sprinkled with a foaming agent, the granules can be used directly in expansion molding to manufacture structural materials.

10 Claims, No Drawings

METHOD FOR PREPARING EASILY PROCESSABLE POLYOLEFIN GRANULE

This is a continuation, application Ser. No. 212,684, filed Dec. 27, 1971, now abandoned.

This invention relates to a method for preparing easily pourable polyolefin granules. More particularly, this invention relates to a method for preparing easily pourable polyolefin granules by polymerizing an olefin in the presence of a polymerization catalyst system comprising a compound having a main catalyst component supported on a spheroidal particle of a high molecular compound used as a carrier and an organometallic compound.

Olefin polymers are generally used as a material for manufacturing transport cases for bottled beer, mandarin oranges, or a bucket, etc., by the injection molding process, and bottles, fuel cans, etc., by the blow molding process. In such molding processes, the olefin polymer is used in the form of pellets but not in the form of a powder except for special cases. When a polyolefin in the powder form is used in said processes, the material is difficulty taken up by the screw of an extrusion unit, and moreover, owing to the poor pourability of the powder, is liable to bridge in the hopper, resulting in considerable fluctuation in the extruder output. If fine particles are contained, they tend to scatter about and may cause deterioration of the working environment. Because of such disadvantages, polyolefins in the form of a powder or small granules are used in their processing generally after having been pelletized.

However, to obtain a pellet, a pelletizing step is necessary, and hence the material cost will increase as much. If it is possible to obtain in the polymerization step a polyolefin granule which may be used as an equivalent of a pellet, the economical advantage resulting from omission of the pelletizing step will be evident. However, the polyolefin obtained from the polymerization step has heretofore been generally a powder which lacks uniformity in size, has a poor pourability, and contains a significant amount of fine powders, so that it has been unable to be used as a processing material in the same way as in the case of a pellet.

An object of this invention is to provide a method for obtaining an easily pourable polyolefin granule in the polymerization step.

The present inventors conducted researches on the method for obtaining in the polymerization step a polyolefin granule which may be used as a substitute for the pellet, in order to improve the aforementioned disadvantages of the conventional powder polyolefin. As a result, the present inventors have found to their surprise that a polyolefin granule, in which all of the aforementioned disadvantages have been improved, may be obtained even by nearly the same polymerization procedure as that conventionally used, by simply using a polymerization catalyst system comprising a compound having a main catalyst component supported on spheroidal particles, 1 to 1,000 $\mu$ in diameter, of a high molecular compound and an organometallic compound.

According to the method of this invention, on account of the favorable shape and quality of the polyolefin granules formed during polymerization, a high solvent efficiency (quantity of the polyolefin formed per unit quantity of the solvent) may be realized, resulting in an economical advantage.

Further, according to the present method, the polyolefin granules formed may be easily controlled in particle size and distribution thereof, so that a suitable particle size and distribution thereof may be chosen in accordance with the processing procedure.

The polyolefin granules obtained according to this invention contain little of fine powders and exhibit a remarkably favorable appearance because of uniformity in the form and size so that they are salable even as they are. Moreover, the granules have a bulk density of 0.4 to 0.6 g/cc, which is of the same order as that of pellets, and a desirable pourability. In processing, the granules obtained according to this invention are easily taken up by the extruder screw from the hopper, and there occurs no bridging phenomenon in the hopper. Consequently, the granules are well suited as the substitute for pellets. Thus, the method of this invention provides an economical advantage by eliminating the pelletizing step, and is superior in this respect over the conventional method.

The polyolefin granules obtained according to this invention can be used similarly to the pellets as the material to be processed into, for example, injection-molded articles, blow-molded articles, films, etc. When sprinkled with a foaming agent, the granules can be used directly in expansion molding to manufacture structural materials.

The high molecular compounds used as the carriers in this invention include polyethylene, polypropylene, polybutene, poly-4-methylpentene-1, polystyrene, polyisoprene, polybutadiene, polyvinyl acetate, polyvinyl chloride, polyvinyl alcohol, polyacetal, polycarbonate, polyethylene oxide, polyacrylonitrile, acrylate polymers, polyamides such as nylon, polyesters, phenol-formaldehyde resins, urea resins, melamine resins, ABS resins, polyurethanes, acetylcellulose, starch, etc. The carriers for use are not restricted to those listed above. Any other polymeric substance can be used as the carrier so long as it is insoluble or sparingly soluble in the polymerization medium and will not strongly inactivate the catalyst component. Carriers having a particle size of 1 to 1,000 $\mu$, preferably 10 to 500 $\mu$ are generally used. The shape of the polymer granule formed is closely correlated with that of the carrier. Therefore, when, for example, a spherical polymer is desired to be obtained, due consideration should be given to select a carrier which is sphere-like as closely as possible.

As mentioned above, there is no very severe restriction with respect to the physical properties of the carrier, but it is preferred to use a sphere-like carrier in increasing bulk density as well as uniformity of the polymer granules to be formed. Carriers having a high bulk density are also preferable.

The method of this invention is applicable to a number of known catalyst systems for olefin polymerization. The main catalyst component to be supported on the carrier is subjected to no special restriction, except that when supported on the carrier the catalyst component has to remain insoluble in the polymerization medium during polymerization. When, for example, the well-known catalyst system for olefin polymerization comprising a compound of a transition metal of Groups IV to VI of the Periodic System and an organometallic compound of a metal of Groups I to III of the Periodic System, is used in the present method, various compounds of transition metals can be supported on the carrier as the main catalyst components. There may be used, for example, titanium trichloride, zirconium tetrachloride, chromium chloride, chromium oxide, vanadyl dichloride, vanadium trichloride, ammonium metavanadate, and vanadium pentoxide.

The reaction product of vanadium pentoxide with phosphoric acid, or said reaction product after being treated with an alcohol, which have been disclosed in Japanese Pat. Publication Nos. 15,655/69 and 19,250/69 and Japanese Pat. Application Nos. 56,506/67, 60,343/67, 9,018/68 and 34,453/70, is especially advantageous because said reaction product is easily supported on the carrier owing to the stability of the solution containing it and is highly active.

Moreover, in the case where there is used in polymerization the supported catalyst prepared by supporting, as a main catalyst component, the above-said reaction product of vanadium pentoxide with phosphoric acid, or said reaction product after being treated with an alcohol, the physical state of the polymer which is formed is markedly improved. Consequently, in polymerization of ethylene using the said supported catalyst, 400 g or more of polyethylene per 1,000 ml of the solvent which is used in the polymerization may be produced. It is obvious also from the above-mentioned fact that the present method is advantageous from the economic standpoint.

The proportion of the main catalyst component supported on a high molecular compound (hereinafter referred to as "loading rate") is 50% by weight or less, preferably 0.5 to 30% by weight, depending partly on the particle size of a polyolefin to be produced.

Loading rate is calculated by the following equation:

$$\text{Loading rate (\%)} = \frac{\text{Main catalyst component (g)}}{\text{Main catalyst component (g) + Carrier (g)}} \times 100 = \frac{\text{Main catalyst component (g)}}{\text{Supported catalyst (g)}} \times 100$$

The most general way of supported catalyst preparation is by thoroughly contacting a carrier with a solution containing the prescribed amount of the main catalyst component dissolved therein, and then removing the excess solvent by distillation under reduced pressure with or without heating, to leave the main catalyst component supported on the carrier. In this case, as the solvent for dissolving the main catalyst component, there is used water, an alcohol such as methanol, ethanol, propanol, butanol, or the like, acetone, ether, etc. The solvents for use are not restricted to those enumerated above. In case the main catalyst component is thermally unstable, it is necessary to lower the temperature of solvent removal by adjusting the vacuum.

Beside the above-mentioned method for loading the carrier with the main catalyst component, there are other methods including a method in which the main catalyst component is vaporized and the vapor deposits directly on the carrier to form a supported catalyst, and a method in which the main catalyst component, if it is a liquid, is directly contacted with a carrier to be supported thereon. The loading method is not restricted to those mentioned above. The main catalyst component can be supported by any method so far as it is properly supported.

Further, according to the present invention, the particle size of the polyolefin formed can be very easily controlled by properly controlling the particle size of a carrier, the efficiency of the catalyst (quantity of the polyolefin formed per unit quantity of the main catalyst component), or the loading rate of the catalyst. For example, if it is desired to obtain large polyolefin granules, the object can be achieved by using a carrier of large particle size, by increasing efficiency of the catalyst, or by increasing the loading rate of the catalyst. On the other hand, since a correlationship exists between the particle size distribution of the formed polyolefin and that of the carrier, it is possible to obtain polyolefin granules of various size distribution by properly controlling the particle size distribution of the carrier. That is, polyolefin granules with a narrow size distribution can be obtained by simply using a carrier with a narrow particle size distribution, and polyolefin granules with a wide size distribution by using a carrier with a wide size distribution. Thus, it is also one of the distinguished features of the present invention that the size and the size distribution of the polyolefin granules may be easily controlled.

The olefins for polymerization in the present invention are ethylene, propylene, butene-1, 4-methylpentene-1, and the like. This invention is effective particularly for ethylene and propylene.

The organometallic compound is an aluminum compound represented by the general formula $R_nAlX_{3-n}$ (wherein R represents a hydrocarbon group having 1 to 8 carbon atoms, X represents a group selected from halogen atoms, alkoxy groups and hydrogen, and n is a positive number of 3 or less). The typical compounds include triethylaluminum, triisobutylaluminum, trioctylaluminum, diethylaluminum chloride, diethylaluminum bromide, ethylaluminum dichloride, ethylaluminum sesquichloride, diisobutylaluminum fluoride, and the like. Beside these compounds, organometallic compounds of sodium, beryllium, magnesium, and zinc are used.

Depending upon the type of the monomer used, a polymerization pressure of 100 kg/cm$^2$ or less and a polymerization temperature lower than both of the melting points of the polymer formed and the high molecular compound used as a carrier are used.

Examples of the present invention are given below, but the scope of the invention is not limited to the examples.

The bulk density was measured according to the method specified in the Japanese Industrial Standard (JIS K 6721-1959). In measuring the bulk density, the time required for the definite volume (about 120 ml) of polyolefin granules to flow was also recorded and the said time (hereinafter referred to as "flow time") was used as a measure of pourability.

CATALYST PREPARATION 1

80 Grams of vanadium pentoxide and 4 liters of a 25 w/w %-aqueous solution of orthophosphoric acid were introduced into a flask, mixed, and heated. After the vanadium pentoxide had completely dissolved, heating was discontinued and the flask was cooled. The yellow crystalline precipitates which had deposited were collected by filtration, washed with water, and then dried at 40° C to a constant weight, to obtain 119 g of a yellow solid. This reaction product was used as an intermediate material in the subsequent treatments.

Into a three-necked 200-ml flask provided with a stirrer, a condenser attached downwardly, and a dropping funnel, were introduced 10 g of the intermediate material and 75 g of n-butyl alcohol. While heating the flask strongly in an oil bath at 140° C and distilling the alcohol, the alcohol treatment of the intermediate material was continued for 12 hours. As the liquid distilled from the flask, fresh n-butyl alcohol was fed through the dropping funnel to maintain a constant liquid level in the flask. After being cooled, the contents of the flask were filtered to remove insoluble matters, and the filtrate was evaporated to dryness under reduced pressure to obtain 10.42 g of a brown solid.

2.0 Grams of the main catalyst component obtained as mentioned above was dissolved in 25 ml of n-amyl alcohol to prepare a catalyst solution. On the other hand, in a 1-liter pear-shaped flask, was placed 48 g of sphere-like high-density polyethylene having a bulk density of 0.43 g/cc, which had been screened to particle diameters of 74 to 105 $\mu$. Into said flask, was added the above-obtained catalyst solution drop by drop so as to cover uniformly the carrier. After the addition of the catalyst solution had been completed, the flask was kept standing still at 30° C for about 15 hours. Then, the contents of the flask was freed from the n-amyl alcohol in a rotary evaporator, in a period of 2 hours, at 80° C and under a reduced pressure of 2 mmHg, to prepare a supported catalyst component. The loading rate was 4%.

CATALYST PREPARATION 2

Using the same main catalyst component and the same carrier and in the same manner as in Catalyst Preparation 1, four supported main catalyst components were prepared, which had loading rates of 1, 10, 15 and 30% respectively.

CATALYST PREPARATION 3

A catalyst solution was prepared by dissolving 4.0 g of titanium trichloride in 30 ml of methanol. On the other hand, in a 1-liter pear-shaped flask, was placed 46.0 g of low-density polyethylene, the particles of which are approximately spherical and have a bulk density of 0.30 g/cc, prepared from a trichloroethylene solution. Into said flask, was added dropwise the above-said catalyst solution, and the flask was left standing at 50° C for 5 hours. Then, the contents of the flask were freed from the methanol by distillation in a rotary evaporator, in a period of 2 hours at 50° C and under a reduced pressure of 1 mmHg, to prepare a supported main catalyst component. The load rate was 8%.

CATALYST PREPARATION 4

A main catalyst component was synthesized in the same manner as shown in Catalyst Preparation 1, and the liquid reaction mixture was directly used as the catalyst solution without isolating as a solid the reaction product soluble in the liquid reaction mixture. The supported main catalyst component was prepared in the same manner as in Catalyst Preparation 1, except that 25 ml of the said catalyst solution (0.1 g catalyst/ml alcohol) and 47.5 g of polypropylene as a carrier in the form of spheroidal granules screened to granule diameters of 105 to 210 $\mu$, were used. The loading rate was 5%.

CATALYST PREPARATION 5

A supported main catalyst component was prepared in the same manner and under the same conditions as in Catalyst Preparation 3, except that 2.5 g of vanadium trichloride and as a carrier 47.5 g of the same polypropylene powder as that used in Catalyst Preparation 4 were used. The loading rate was 5%.

CATALYST PREPARATION 6

A supported main catalyst component was prepared in the same manner and under the same conditions as in Catalyst Preparation 3, except that 4.5 g of titanium trichloride and as a carrier 45.5 g of the same polypropylene powder as that used in Catalyst Preparation 4 were used. The loading rate was 9%.

CATALYST PREPARATION 7

A supported main catalyst component was prepared in the same manner and under the same conditions as in Catalyst Preparation 1, except that 25 ml of a catalyst solution (concentration: 0.20 g/ml), prepared in the same manner as in Catalyst Preparation 1 and as a carrier 45.0 g of polyvinyl chloride in the form of spheroidal particles screened to particle diameters of 74 to 105 $\mu$. The loading rate was 10%.

CATALYST PREPARATION 8

To 9.0 g of a starch powder, 50 $\mu$ in mean particle diameter, which had been dried at 90° C under reduced pressure for 2 hours, was added drop by drop, so as to cover uniformly the carrier, a catalyst solution which was prepared by dissolving 1.0 g of the main catalyst component obtained in Catalyst Preparation 1 in a mixed solvent comprising 1 ml of n-amyl alcohol and 3 ml of n-heptane. After having been left standing at room temperature for 20 hours, the carrier loaded with the catalyst was freed from volatile matters in a rotary evaporator at 80° C under a reduced pressure of 2 mmHg to prepare a supported main catalyst component. The loading rate was 10%.

EXAMPLE 1

Into a 1,000-ml stainless-steel autoclave equipped with a stirrer of the electromagnetic induction type, after the air in the autoclave having been replaced with dry nitrogen, was charged 0.5 g of the supported main catalyst component, which had been obtained in Catalyst Preparation 1 and suspended in 100 ml of n-heptane. After addition of 300 ml of n-heptane, stirring was started. Then, into the autoclave, was charged 0.33 g of diethylaluminum chloride dissolved in 50 ml of n-heptane, then followed by final 50 ml of n-heptane to wash down the remnants of diethylaluminum chloride into the autoclave. The autoclave was warmed by means of an oil bath. When the inner temperature reached 60° C, hydrogen was forced in to a pressure of 4 kg/cm$^2$-gauge, then followed by ethylene to a total pressure of 21 kg/cm$^2$-gauge (the partial pressure of ethylene being 17 kg/cm$^2$). The reaction was carried out for 2 hours while the total pressure having been maintained at 21 kg/cm$^2$-gauge by replenishing ethylene as the reaction proceeded. After completion of the reaction, the unreacted gas was purged and the contents of the autoclave were discharged. The solid reaction product was collected by filtration, admixed with three times its volume of a mixture comprising methanol and hydrochloric acid in a ratio of 1 : 1 by volume, and heated to leach out the catalyst residue. The solid product was collected by filtration, washed several time with methanol, and dried under reduced pressure at 50° C for 10 hours. The yield of polyethylene was 78.6 g. The polyethylene thus obtained was spheroidal granules, 400 to 500 $\mu$ in diameter, with an extremely uniform appearance, containing very little of fine powders. The bulk density was 0.48 g/cc. In measuring the bulk density, the polyethylene flowed smoothly through the funnel without accompanying a bridging phenomenon. The flow time was 5.5 seconds.

A supported main catalyst component was prepared in the same manner as in Catalyst Preparation 1, except that the polyethylene granules obtained in this Example were used as a carrier. Using the supported main catalyst component thus prepared, polymerization was conducted under the above-mentioned conditions to obtain polyethylene granules having a bulk density of 0.49 g/cc and a flow time of 5.1 seconds.

COMPARATIVE EXAMPLE

Polymerization was conducted in the presence of the unsupported main catalyst component as it is prepared in Catalyst Preparation 1, under otherwise the same conditions as in Example 1, to obtain polyethylene in a yield of 73.1 g. The polyethylene thus obtained had a bulk density of 0.23 g/cc and consisted of a mixture of particles ranging from 1 to 1,000 $\mu$ in diameter. The particles were non-uniform and contained fine powders. In measuring the bulk density, said polyethylene revealed a poor pourability due to occurrence of a bridging phenomenon in the funnel. Because of said bridging phenomenon in the funnel, an exact measurement of the flow time was impossible. An approximate measurement of the flow time was made while continuously stirring the polyethylene powder in the funnel with a thin wire to promote smooth falling of the polyethylene. A flow time of about 8 seconds was obtained.

EXAMPLES 2 to 5

Ethylene was polymerized under the same conditions as in Example 1 by use of the supported main catalyst component prepared in Catalyst Preparation 2, the loading rate having been 1, 10, 15 and 30% respectively. The results obtained were as shown in Table 1.

EXAMPLE 7

Ethylene was polymerized in the same apparatus as in Example 1 in the presence of 0.4 g of the supported main catalyst component prepared in Catalyst Preparation 4, 0.35 g of ethylaluminum sesquichloride and 2.1 g of propylene, at 60° C for 2 hours under an ethylene partial pressure of 17 kg/cm$^2$ and a hydrogen partial pressure of 4 kg/cm$^2$. The yield of an ethylene-propylene copolymer was 85.3 g. The ethylene-propylene copolymer obtained was spheroidal granules, 600 to 1,200 $\mu$ in diameter, containing very little amount of fine powders. The bulk density was 0.47 g/cc, and no bridging phenomenon was observed in measuring the bulk density, the pourability being satisfactory. The flow time was 4.9 seconds.

EXAMPLE 8

Ethylene was polymerized in the same apparatus as in Example 1 in the presence of 0.5 g of the supported main catalyst component prepared in Catalyst Preparation 5 and 0.33 g of diethylaluminum chloride at 60° C for 2 hours under a hydrogen partial pressure of 4 kg/cm$^2$ and an ethylene partial pressure of 17 kg/cm$^2$. The yield of polyethylene was 72.8 g. The polyethylene obtained was spheroidal granules, 550 to 1,100 $\mu$ in diameter, containing very little amount of fine powders. The bulk density was 0.47 g/cc, and no bridging phenomenon was observed in measuring the bulk density, the pourability being satisfactory. The flow time was 5.0 seconds.

EXAMPLE 9

Propylene was polymerized in the same apparatus as in Example 1 in the presence of 2.0 g of the supported main catalyst component prepared in Catalyst Preparation 6 and 0.33 g of diethylaluminum chloride, at 60° C Table 1

| Example No. | Main catalyst component | | Polymer formed | | | | Solvent efficiency* |
|---|---|---|---|---|---|---|---|
| | Loading rate, % | Amount used, g | Yield, g | Granule dia., $\mu$ | Bulk density, g/cc | Flow time, sec. | |
| 2 | 1 | 2.0 | 80.1 | 250 – 350 | 0.47 | 5.6 | 160 |
| 3 | 10 | 0.5 | 161.3 | 500 – 700 | 0.48 | 5.4 | 323 |
| 4 | 15 | 0.5 | 216.6 | 550 – 800 | 0.48 | 5.3 | 433 |
| 5 | 30 | 0.2 | 128.4 | 600 – 900 | 0.47 | 5.1 | 257 |

Note:

*Solvent efficiency = $\dfrac{\text{Polymer formed, g}}{\text{Solvent used for polymerization, liter}}$ Every polymer obtained in these Examples had a favorable physical form, without containing fine powders, and showed no bridging phenomenon in measuring the bulk density, the pourability being satisfactory.

EXAMPLE 6

Ethylene was polymerized in the same apparatus as in Example 1 in the presence of 1.0 g of the supported main catalyst component prepared in Catalyst Preparation 3 and 0.33 g of diethylaluminum chloride, at 60° C for 4 hours under an ethylene partial pressure of 5 kg/cm$^2$ and a hydrogen partial pressure of 3 kg/cm$^2$. The yield of polyethylene was 81.6 g. The polyethylene obtained was spheroidal granules, 140 $\mu$ in mean diameter, containing very little amount of fine powders. The bulk density was 0.42 g/cc and no bridging phenomenon was observed in measuring the bulk density, the pourability being satisfactory. The flow time was 6.8 seconds.

for 5 hours under a propylene pressure of 5 kg/cm$^2$. The yield of polypropylene was 55.3 g. The polypropylene obtained was spheroidal granules, 315 to 630 $\mu$ in diameter, containing little amount of fine powders. The bulk density was 0.53 g/cc and no bridging phenomenon in the funnel was observed in measuring the bulk density, the pourability being satisfactory. The flow time was 4.8 seconds.

EXAMPLE 10

Ethylene was polymerized in the same apparatus as in Example 1 in the presence of 0.2 g of the supported main catalyst component prepared in Catalyst Preparation 7 and 0.31 g of triethylaluminum, at 60° C for 3 hours under a hydrogen partial pressure of 4 kg/cm$^2$ and an ethylene partial pressure of 17 kg/cm$^2$. The yield of polyethylene was 58.7 g. The polyethylene obtained was spheroidal particles, 500 to 700 $\mu$ in diameter, containing little amount of fine powders. The bulk density was 0.47 g/cc, and no bridging in the funnel was observed in measuring the bulk density, the pourability being satisfactory. The flow time was 5.8 seconds.

EXAMPLE 11

Ethylene was polymerized in the same apparatus as in Example 1 in the presence of 0.8 g of the supported main catalyst component prepared in Catalyst Preparation 8 and 0.33 g of diethylaluminum chloride, at 60° C for 4 hours, under an ethylene partial pressure of 12 kg/cm$^2$ and a hydrogen partial pressure of 9 kg/cm$^2$. The yield of the polyethylene was 118.6 g. The polyethylene obtained was spheroidal granules, 250 $\mu$ in mean diameter, containing very little amount of fine powders.

EXAMPLE 12

In a 200-liter autoclave, ethylene was polymerized at 60° C for 15 hours under the following conditions to obtain 17.4 kg of spheroidal polyethylene granules: 4.0 g of the supported main catalyst component obtained in Catalyst Preparation 1; 66 g of diethylaluminum chloride, ethylene partial pressure of 13 kg/cm$^2$, and hydrogen partial pressure of 8 kg/cm$^2$. The spheroidal polyethylene granules obtained were tested for the performance in injection molding by means of an injection molding machine (Type V-15-17 of Nikko-Ankerwerk Co.). The granules showed a good pourability in the hopper and proved satisfactorily usable in place of conventional pellets.

What is claimed is:

1. A method for preparing easily pourable polyolefin granules, which comprises
    polymerizing an olefin in the presence of a polymerization catalyst system comprising
    a main catalyst component, selected from the group consisting of a reaction product of vanadium pentoxide with phosphoric acid and a reaction product of vanadium pentoxide with phosphoric acid, which was treated with an alcohol and which is supported on a spheroidal particle of a high molecular compound used as a carrier by contacting a solution containing the main catalyst component dissolved in a solvent with said high molecular compound and then removing the solvent therefrom by distillation, said spheroidal particle being a high molecular compound having a diameter of 1–1000 $\mu$ and selected from the group consisting of polyethylene, polypropylene, polybutene, poly-4-methylpentene-1, polystyrene, polyisoprene, polybutadiene, polyvinyl acetate, polyvinyl alcohol, polyacetal, polycarbonate, polyethylene oxide, polyacrylonitrile, polyacrylates, polyamides, polyesters, phenolformaldehyde resins, urea resins, melamine resins, ABS resins, polyurethanes, acetylcellulose and starch, the proportion of said main catalyst component supported on said high molecular compound being 0.5 to 30% by weight, and
    an organoaluminum compound represented by the general formula $R_nAlX_{3-n}$ wherein R represents a hydrocarbon group having 1 to 8 carbon atoms, X represents a group or an atom selected from halogen atoms, alkoxy groups and hydrogen atom, and n is a positive number of 3 or less,
        under a pressure of no greater than 100 kg/cm$^2$ at a temperature lower than both of the melting points of the resulting polymer and said high molecular compound used as a carrier.

2. The method of claim 1, wherein said organoaluminum compound is a member selected from the group consisting of triethylaluminum, triisobutylaluminum, trioctylaluminum, diethylaluminum chloride, diethylaluminum bromide, ethylaluminum sesquichloride, and diisobutylaluminum fluoride.

3. The method of claim 1, wherein the bulk density of the easily pourable polyolefin is 0.4 to 0.6 g/cc.

4. The method of claim 1, wherein said high molecular compound is the polyolefin granules prepared by the method according to claim 1.

5. A method for preparing easily pourable polyolefin granules, which comprises
    polymerizing at least one olefin selected from the group consisting of ethylene, propylene, butene-1 and 4-methyl pentene-1
    in the presence of a polymerization catalyst system comprising
    a main catalyst component selected from the group consisting of a reaction product of vanadium pentoxide with phosphoric acid and a reaction product of vanadium pentoxide with phosphoric acid, which was treated with an alcohol and which is supported on a spheroidal particle of a high molecular compound used as a carrier by contacting a solution containing the main catalyst component dissolved in a solvent with said high molecular compound and then removing the solvent therefrom by distillation, said spheroidal particle being a high molecular compound having a diameter of 1–1000 $\mu$ and selected from the group consisting of polyethylene, polypropylene, polybutene, poly-4-methylpentene-1, polystyrene, polyisoprene, polybutadiene, polyvinyl acetate, polyvinyl chloride, polyvinyl alcohol, polyacetal, polycarbonate, polyethylene oxide, polyacrylonitrile, polyacrylates, polyamides, polyesters, phenol-formaldehyde resins, urea resins, melamine resins, ABS resins, polyurethanes, acetylcellulose and starch, the proportion of said main catalyst component supported on said high molecular compound being 0.5 to 30% by weight, and
    an organoaluminum compound represented by the general formula $R_nAlX_{3-n}$ wherein R represents a hydrocarbon group having 1 to 8 carbon atoms, X represents a group or an atom selected from halogen atoms, alkoxy groups and hydrogen atom, and n is a positive number of 3 or less,
        under a pressure of no greater than 100 kg/cm$^2$ at a temperature lower than both of the melting points of the resulting polymer and said high molecular compound used as a carrier.

6. The method of claim 5, wherein said main catalyst component is a reaction product of vanadium pentoxide with phosphoric acid.

7. The method of claim 5, wherein said main catalyst component is a reaction product of vanadium pentoxide with phosphoric acid, which was treated with an alcohol.

8. The method of claim 5, wherein said organoaluminum compound is a member selected from the group consisting of triethylaluminum, triisobutylaluminum, trioctylaluminum, diethylaluminum chloride, diethylaluminum bromide, ethylaluminum sesquichloride, and diisobutylaluminum fluoride.

9. The method of claim 5, wherein the bulk density of the easily pourable polyolefin is 0.4 to 0.6 g/cc.

10. The method of claim 5, wherein said high molecular compound is the polyolefin granules prepared by the method according to claim 5.